(12) United States Patent
Alms et al.

(10) Patent No.: US 9,079,367 B2
(45) Date of Patent: Jul. 14, 2015

(54) SYSTEMS AND METHODS FOR CONTROLLING PERMEABILITY IN VACUUM INFUSION PROCESSES

(75) Inventors: Justin B. Alms, Glastonbury, CT (US); Suresh G. Advani, Newark, DE (US); James L. Glancey, Blackbird, DE (US)

(73) Assignee: University of Delaware, Newark, DE (US)

( * ) Notice: Subject to any disclaimer, the term of this patent is extended or adjusted under 35 U.S.C. 154(b) by 318 days.

(21) Appl. No.: 13/217,641

(22) Filed: Aug. 25, 2011

(65) Prior Publication Data

US 2012/0068382 A1    Mar. 22, 2012

Related U.S. Application Data

(60) Provisional application No. 61/376,893, filed on Aug. 25, 2010.

(51) Int. Cl.
| | | |
|---|---|---|
| *B29C 70/44* | (2006.01) | |
| *B29C 70/54* | (2006.01) | |
| *B29C 33/32* | (2006.01) | |
| *B29C 33/42* | (2006.01) | |

(52) U.S. Cl.
CPC .............. *B29C 70/546* (2013.01); *B29C 70/443* (2013.01); *B29C 33/32* (2013.01); *B29C 33/42* (2013.01); *B29C 2791/007* (2013.01)

(58) Field of Classification Search
CPC ........................... B29C 2045/645; B29C 33/32
See application file for complete search history.

(56) References Cited

U.S. PATENT DOCUMENTS

| | | | | |
|---|---|---|---|---|
| 3,339,239 | A | | 9/1967 | Peck |
| 4,622,091 | A | | 11/1986 | Letterman |
| 4,902,215 | A | | 2/1990 | Seemann |
| 5,007,814 | A | * | 4/1991 | Saunders et al. .................. 425/3 |

(Continued)

FOREIGN PATENT DOCUMENTS

| | | |
|---|---|---|
| EP | 0045555 A1 | 2/1982 |
| WO | WO-2004101259 A2 | 11/2004 |

(Continued)

OTHER PUBLICATIONS

International Search Report dated Mar. 20, 2012, application No. PCT/US2011/049095.

(Continued)

*Primary Examiner* — Christina Johnson
*Assistant Examiner* — David Schmerfeld
(74) *Attorney, Agent, or Firm* — RatnerPrestia

(57) ABSTRACT

Systems and methods for controlling permeability in vacuum infusion processes are disclosed. A system includes a tool surface, a flexible film, a preform, a magnetic field source, and a magnetic element. The flexible film has a periphery sealingly coupled to the tool surface to define a volume. The preform is disposed within the volume. The magnetic field source is configured to generate a magnetic field. The magnetic element is positioned to receive the magnetic field generate by the magnetic field source. The magnetic element is configured to move the flexible film away from the upper side of the tool surface under application of the magnetic field. A method includes generating a magnetic field with the magnetic field source and receiving the magnetic field with the magnetic element to move the flexible film away from the upper side of the tool surface, thereby increasing permeability of the preform.

16 Claims, 4 Drawing Sheets

100

(56) References Cited

U.S. PATENT DOCUMENTS

| | | | |
|---|---|---|---|
| 5,052,906 A | 10/1991 | Seemann | |
| 5,316,462 A | 5/1994 | Seemann | |
| 5,443,778 A | 8/1995 | Schlingman | |
| 5,772,950 A | 6/1998 | Brustad | |
| 5,885,495 A | 3/1999 | Ibar | |
| 5,902,535 A | 5/1999 | Burgess | |
| 6,298,896 B1 | 10/2001 | Sherrill | |
| 6,299,819 B1 | 10/2001 | Han | |
| 6,406,659 B1* | 6/2002 | Lang et al. | 264/510 |
| 6,406,660 B1 | 6/2002 | Spurgeon | |
| 6,506,325 B1 | 1/2003 | Cartwright | |
| 6,555,045 B2 | 4/2003 | McClure | |
| 7,334,782 B2 | 2/2008 | Woods | |
| 7,517,481 B2 | 4/2009 | Advani | |
| 7,762,122 B2 | 7/2010 | Advani | |
| 8,210,841 B2* | 7/2012 | Alms et al. | 425/504 |
| 2002/0022422 A1 | 2/2002 | Waldrop | |
| 2002/0081147 A1 | 6/2002 | Gianaris | |
| 2002/0155186 A1 | 10/2002 | Walsh | |
| 2003/0025232 A1 | 2/2003 | Slaughter | |
| 2003/0111773 A1 | 6/2003 | Janusson | |
| 2003/0211194 A1 | 11/2003 | Louderback | |
| 2004/0049324 A1 | 3/2004 | Walker | |
| 2004/0109909 A1 | 6/2004 | Dubay | |
| 2005/0042961 A1 | 2/2005 | Lehmann | |
| 2005/0053765 A1 | 3/2005 | Albers | |
| 2005/0253309 A1 | 11/2005 | Hou | |
| 2006/0255500 A1 | 11/2006 | Advani | |
| 2007/0063393 A1 | 3/2007 | Vernin | |
| 2007/0132142 A1 | 6/2007 | Voegeli | |
| 2007/0158874 A1 | 7/2007 | Van Herpt | |
| 2008/0136060 A1 | 6/2008 | Shpik | |
| 2009/0273107 A1 | 11/2009 | Advani | |
| 2010/0072677 A1 | 3/2010 | Alms | |
| 2011/0006460 A1* | 1/2011 | Vander Wel et al. | 264/403 |
| 2011/0046771 A1 | 2/2011 | Alms | |

FOREIGN PATENT DOCUMENTS

| | | |
|---|---|---|
| WO | WO-2007040797 A2 | 4/2007 |
| WO | WO-2007040797 A3 | 4/2007 |
| WO | WO-2007054101 A1 | 5/2007 |

OTHER PUBLICATIONS

International Application Serial No. PCT/US2010/045850, International Written Opinion mailed Jun. 23, 2011, 5 pgs.

International Application Serial No. PCT/US2010/045850, International Search Report mailed Jun. 23, 2011, 4 pgs.

Advani, Suresh G., "Process Modeling in Composites Manufacturing", Marcel Dekker, Inc., ISBN 0-8247-0860-1 (2003), 1-19, 23-55, 150-165, 174-223.

Allende, Melquiades, "Experimental and Numerical Analysis of Flow Behavior in the FASTRAC Liquid Composite Manufacturing Process", Polymer Composites, vol. 25, No. 4 (Aug. 2004), 384-396.

Allende, Melquiades, "Characterization and Analysis of Flow Behavior in the FASTRAC Process for the Manufacture of Sandwich and Core Composite Structures", International SAMPE Symposium and Exhibition, vol. 48, (May 11-15, 2003), 303-311.

Alms, Justin, "Simulation and Experimental Validation of Flow Flooding Chamber Method of Resin Delivery in Liquid Composite Molding", Composites: Part A, vol. 38 (2007), 2131-2141.

Alms, J. B., "Flow Modification Process for Vacuum Infusion Using Port-Based Resin Flow Control", SAMPE Journal, vol. 45, No. 2 (Mar./Apr. 2009), 54-63.

Alms, Justin B., "Mechanical Properties of Composite Structures Fabricated with the Vacuum Induced Preform Relaxation Process", Composite Structures, vol. 92 (2010), 2811-2816.

Alms, Justin B., "In-Plane Permeability Characterization of the Vacuum Infusion Processes with Fiber Relaxation", Int J Mater Form (Mar. 2010), 9 pgs.

Alms, Justin B., "Liquid Composite Molding Control Methodologies Using Vacuum Induced Preform Relaxation", Composites: Part A, vol. 42 (2011), 57-65.

Bickerton, S., "Experimental Analysis and Numerical Modeling of Flow Channel Effects in Resin Transfer Molding", Polymer Composites, vol. 21, No. 1 (Feb. 2000), 134-153.

Bickerton, Simon, "Design and Application of Actively Controlled Injection Schemes for Resin-Transfer Molding", Composites Science and Technology, vol. 61 (2001), 1625-1637.

Bruschke, M. V., "A Finite Element/Control Volume Approach to Mold Filling in Anisotropic Porous Media", Polymer Composites, vol. 11, No. 6 (Dec. 1990), 398-405.

Correia, N. C., "Use of Resin Transfer Molding Simulation to Predict Flow, Saturation, and Compaction in the VARTM Process", ASME, Journal of Fluids Engineering, vol. 126 (Mar. 2004), 210-215.

Dai, J., "A Comparative Study of Vacuum-Assisted Resin Transfer Molding (VARTM) for Sandwich Panels", Polymer Composites, vol. 24, No. 6 (Dec. 2003), 672-685.

Devillard, Mathieu, "On-line Characterization of Bulk Permeability and Race-Tracking During the Filling Stage in Resin Transfer Molding Process", Journal of Composite Materials, vol. 37, No. 17 (2003), 1525-1541.

Fuqua, Michael, "A Port Injection Process for Improved Resin Delivery and Flow Control in Vacuum-Assisted Resin Transfer Molding", Proceedings of the IMECE '06, 2006 ASME International Mechanical Engineering Congress & Exposition (Nov. 5-11, 2006), 13 pgs.

Gokce, Alil, "Permeability Estimation Algorithm to Simultaneously Characterize the Distribution Media and the Fabric Preform in Vacuum Assisted Resin Transfer Molding Process", Composites Science and Technology, vol. 65 (2005), 2129-2139.

Hammami, Adel, "Key Factors Affecting Permeability Measurement in the Vacuum Infusion Molding Process", Polymer Composites, vol. 23, No. 6 (Dec. 2002), 1057-1067.

Hsiao, K-T., "A Closed Form Solution for Flow During the Vacuum Assisted Resin Transfer Molding Process", ASME, Journal of Manufacturing Science and Engineering, vol. 122 (Aug. 2000), 463-475.

Hsiao, Kuang-Ting, "Simulation Based Flow Distribution Network Optimization for Vacuum Assisted Resin Transfer Moulding Process", Modelling and Simulation in Materials Science and Engineering, vol. 12 (2004), S175-S190.

Johnson, R. J., "Simulation of Active Flow Control Based on Localized Preform Heating in a VARTM Process", Composites: Part A, vol. 37 (2006), 1815-1830.

Johnson, R. J., "Enhancement of Flow in VARTM Using Localized Induction Heating", Composites Science and Technology, vol. 63 (2003), 2201-2215.

Johnson, R. J., "Active Control of Reactive Resin Flow in a Vacuum Assisted Resin Transfer Molding (VARTM) Process", Journal of Composite Materials, vol. 42, No. 12 (2008), 1205-1229.

Johnson, R. J., "Flow Control Using Localized Induction Heating in a VARTM Process", Composites Science and Technology, vol. 67 (2007), 669-684.

Kasprzak, Scott, "A Robotic System for Real-Time Resin Flow Modification During Vacuum-Assisted Resin Transfer Molding", Proceedings of IMECE 2006, 2006 ASME International Mechanical Engineering Congress and Exposition (Nov. 5-10, 2006), 9 pgs.

Lawrence, Jeffrey M., "Dependence Map-Based Flow Control to Reduce Void Content in Liquid Composite Molding", Materials and Manufacturing Processes, vol. 20 (2005), 933-960.

Lawrence, Jeffrey M., "Experimental Study to Illustrate Flow Control in Presence of Race Tracking Disturbances in Resin Transfer Moulding", Advanced Composites Letters, vol. 12, No. 3 (2003), 103-112.

Lawrence, Jeffrey M., "An Approach to Couple Mold Design and On-line Control to Manufacture Complex Composite Parts by Resin Transfer Molding", Composites: Part A, vol. 33 (2002), 981-990.

Lawrence, Jeffrey M., "Automated Manufacturing Environment to Address Bulk Permeability Variations and Race Tracking in Resin Transfer Molding by Redirecting Flow with Auxiliary Gates", Composites: Part A, vol. 36 (2005), 1128-1141.

Lawrence, Jeffrey M., "Design and Testing of a New Injection Approach for Liquid Composite Molding", Journal of Reinforced Plastics and Composites, vol. 23, No. 15 (2004), 1625-1638.

(56) References Cited

OTHER PUBLICATIONS

Lawrence, Jeffrey M., "Use of Sensors and Actuators to Address Flow Disturbances During the Resin Transfer Molding Process", Polymers Composites, vol. 24, No. 2 (Apr. 2003), 237-248.

Lindgren, Maria, "Styrene Emissions from the Spray-Up and Vacuum Injection Processes—A Quantitative Comparison", AIHA Journal, vol. 63 (Mar./Apr. 2002), 184-189.

Markicevic, B., "Role of Flow Enhancement Network During Filling of Fibrous Porous Media", Journal of Porous Media, vol. 8, No. 3 (2005), 281-297.

Marsh, George, "Putting SCRIMP in Context", Reinforced Plastics (Jan. 1997), 22-26.

Modi, Dhiren, "Active Control of the Vacuum Infusion Process", Composites: Part A, vol. 38 (2007), 1271-1287.

Nalla, Ajit R., "A Multi-Segment Injection Line and Real-Time Adaptive, Model-Based Controller for Vacuum Assisted Resin Transfer Molding", Composites: Part A, vol. 38 (2007), 1058-1069.

Rigas, Elias J., "Development of a Novel Processing Technique for Vacuum Assisted Resin Transfer Molding (VARTM)", SAMPE Conference 2001 (May 6-10, 2001), 9 pgs.

Šimáček, Pavel, "Modeling Resin Flow and Fiber Tow Saturation Induced by Distribution Media Collapse in VARTM", Composites Science and Technology, vol. 67 (2007), 2757-2769.

Simacek, Pavel, "Desirable Features in Mold Filling Simulations for Liquid Composite Molding Processes", Polymer Composites, vol. 25, No. 4 (Aug. 2004), 355-367.

Walsh, Shawn M., "Minimizing Cycle Time and Part Mark-Off in the FASTRAC Process", 33rd International SAMPE Technical Conference (Nov. 5-8, 2001), 1398-1407.

Wu, Tom J., "The Bearing Strength of E-Glass/Vinyl-Ester Composites Fabricated by VARTM", Composites Science and Technology, vol. 58 (1998), 1519-1529.

\* cited by examiner

SYSTEMS AND METHODS FOR CONTROLLING PERMEABILITY IN VACUUM INFUSION PROCESSES

CROSS REFERENCE TO RELATED APPLICATIONS

This application claims priority to U.S. Patent Application No. 61/376,893, entitled "MAGNETIC FIELD PERMEABILITY REGULATION IN VACUUM INFUSION PROCESSES," filed on Aug. 25, 2010, the contents of which are incorporated herein by reference in their entirety.

FIELD OF THE INVENTION

The present invention relates generally to vacuum infusion processes, and more particularly, to systems and methods for controlling permeability in vacuum infusion processes.

BACKGROUND OF THE INVENTION

Conventionally, efforts in the composites manufacturing industry have been directed toward low cost manufacturing processes such as Liquid Composite Molding (LCM). In a LCM process, a fibrous preform material is placed into a mold, which is then closed and sealed to prevent leakage before a liquid resin is injected into the mold.

One example of an LCM process is Vacuum Assisted Resin Transfer Molding (VARTM). In VARTM, a single-sided mold tool is sealed by enveloping the preform material with a flexible film adhered to the tool surface with a sealant. A vacuum pump is used to draw the resin from a reservoir into the volume formed between the flexible film and the tool surface.

In the VARTM process, variations in the flexible film and base materials often cause problems during the resin infusion, which cause the infusion to be unsuccessful and the partially infused part to be thrown away as scrap. Accordingly, there remains a need to improve the infusion process of LCM.

SUMMARY OF THE INVENTION

Aspects of the present invention relate to systems and methods for controlling permeability in vacuum infusion processes.

In accordance with one aspect of the present invention, a system for controlling permeability in a vacuum infusion process is disclosed. The system includes a tool surface, a flexible film, a preform, a magnetic field source, and a magnetic element. The flexible film has a periphery sealingly coupled to the tool surface to define a volume between a lower side of the flexible film and an upper side of the tool surface. The preform is disposed within the volume. The magnetic field source is configured to generate a magnetic field. The magnetic element is positioned to receive the magnetic field generate by the magnetic field source. The magnetic element is configured to move the flexible film away from the upper side of the tool surface under application of the magnetic field, thereby increasing permeability of the preform.

In accordance with another aspect of the present invention, a method for controlling permeability in a vacuum infusion process is disclosed. The method includes sealing a periphery of a flexible film to a tool surface to define a volume between a lower side of the flexible film and an upper side of the tool surface, disposing a preform within the volume, generating a magnetic field with a magnetic field source, and receiving the magnetic field with a magnetic element configured to move the flexible film away from the upper side of the tool surface under application of the magnetic field, thereby increasing permeability of the preform.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

The various aspects of the present invention relate generally to a vacuum assisted resin transfer molding (VARTM) system adapted to integrate a magnetic element, such as a magnetic metal element, into the mold that is responsive to a magnetic field source, such as an electromagnet, capable of generating a magnetic field. Accordingly to one aspect of the invention, when the electromagnet is positioned above the mold and switched on, the magnetic element is attracted toward the electromagnet, thereby increasing the volume within the mold, increasing the permeability of a fabric preform within the mold, and providing a faster resin infusion.

One exemplary VARTM process, referred to as a Vacuum Induced Preform Relaxation (VIPR), uses a secondary vacuum chamber to create a seal on the flexible film (outer bag) surface of a vacuum infusion process mold. Applying a vacuum to the upper side of the flexible film causes the fabric preform underneath to relax and become more permeable. An exemplary VIPR process is described in U.S. patent application Ser. No. 11/458,122, entitled "VACUUM ASSISTED RESIN TRANSFER MOLDING TECHNIQUES WITH FLOW FLOODING CHAMBER," filed on Jul. 18, 2006, the contents of which are incorporated herein by reference in their entirety. The present invention incorporates the use of magnets to relax a selected region to increase permeability during infusion. Incorporating magnets may provide advantages over the VIPR process discussed above, inasmuch as increasing permeability with magnetic fields does not require forming an airtight seal with the upper side of the flexible film, as does the VIPR process.

During the VARTM process, a computer controls the flow relaxation achieved by the VIPR system. Exemplary control methodologies are described in U.S. patent application Ser.

No. 12/858,948, now U.S. Pat. No. 8,808,612, titled "COMPUTER CONTROLLED FLOW MANIPULATION FOR VACUUM INFUSION PROCESSES," filed on Aug. 18, 2010, the contents of which are also incorporated herein by reference in their entirety. Among other things, the '612 Patent discloses a method comprising injecting resin through a plurality of resin injection ports, detecting a plurality of resin flow fronts emanating from the resin injection ports, using a processor programmed with a predictive model to predict an effect of increase permeability in each of a plurality of locations based on the detected plurality of resin flow fronts, the predicting comprising simulating a future resin flow front based on a potential location for increasing resin permeability, and selecting a region based on the predicted effect and locally increasing resin permeability in the selected region. The control methodologies set forth in that application may be equally applied to the systems described herein, with substitution of the mechanisms for providing flow relaxation and increased permeability.

Figure 1:
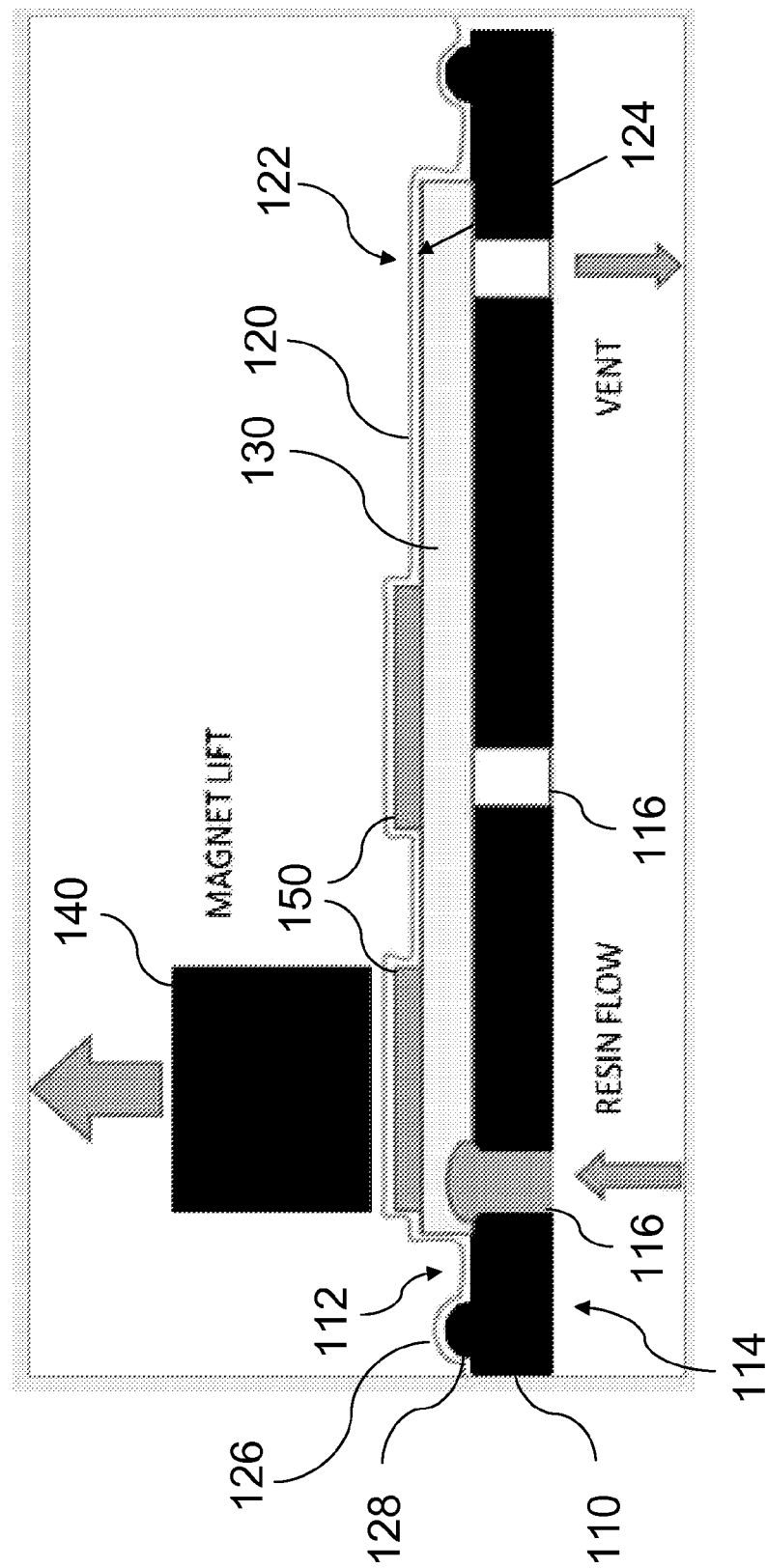
FIG. 1 is a diagram illustrating an exemplary system for controlling permeability in a vacuum infusion process in accordance with aspects of the present invention.
Figure 2:
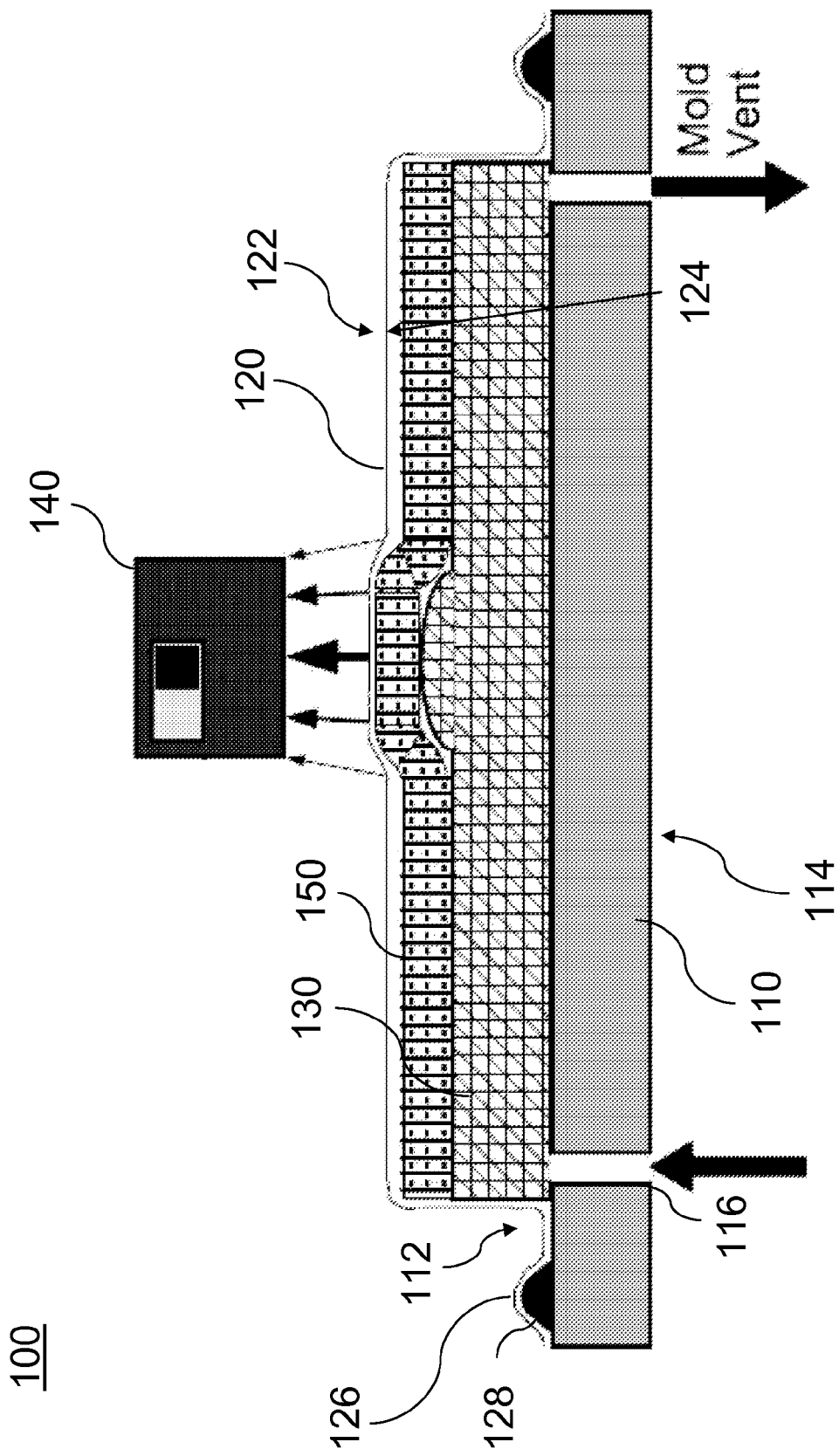
FIG. 2 is a diagram illustrating an alternative exemplary system for controlling permeability in a vacuum infusion process in accordance with aspects of the present invention.

Referring now to the drawings, FIGS. 1 and 2 illustrate an exemplary system 100 for controlling permeability in a vacuum infusion process in accordance with aspects of the present invention. System 100 is usable to increase the fabric permeability of a preform prior to infusion of resin in the vacuum infusion process. As a general overview, system 100 includes a tool surface 110, a flexible film 120, a preform 130, a magnetic field source 140, and a magnetic element 150. Additional details of system 100 are described herein.

Tool surface 110 forms part of the mold for the vacuum infusion process. Tool surface 110 has an upper side 112 and a lower side 114. The upper side 112 of tool surface 110 provides the molded shape of the finished composite material. Tool surface 110 further includes a plurality of injection ports 116 extending from the lower side 114 to the upper side 112. Injection ports 116 enable the infusion of resin into the mold for forming the composite material, as will be explained in further detail below. In an exemplary embodiment, tool surface 110 has a generally planar shape, as shown in FIG. 1. However, it will be understood to one of ordinary skill in the art that tool surface 110 may be contoured, depending on the desired shape of the finished composite material. A suitable tool surface for use with the present invention will be known to one of ordinary skill in the art from the description herein.

Flexible film 120 is sealing coupled to tool surface 110. Like tool surface 110, flexible film 120 has an upper side 122 and a lower side 124. A periphery 126 of flexible film 120 is sealed to tool surface 110 in order to define a volume between the lower side 124 of flexible film 120 and the upper side 112 of tool surface 110, as shown in FIG. 1. Flexible film 120 is sealed to tool surface 110 using a sealant 128. Suitable sealants for use as sealant 128 include, for example, vacuum bag sealant tape supplied by Airtech Advance Materials Group of Hunting Beach, Calif. In an exemplary embodiment, flexible film 120 is formed from a non-rigid polymer material. Suitable polymer materials will be known to one of ordinary skill in the art from the description herein.

Preform 130 is disposed within the volume between tool surface 110 and flexible film 120. Preform 130 includes a plurality of fabric layers positioned on the upper side 112 of tool surface 110. During the vacuum infusion process, resin permeates around and through the fabric layers to form the composite material. Suitable fabric preforms for use with the present invention include, for example, E-Glass, S-2 Glass®, aramids (e.g., Kevlar® and Twaron®) and carbon woven materials produced by Owens Corning.

Magnetic field source 140 is configured to generate a magnetic field. Magnetic field source 140 generates a magnetic field extending through at least a portion of flexible film 120. Magnetic field source 140 may be positioned above or below flexible film 120. In an exemplary embodiment, magnetic field source 140 comprises an electromagnet. The electromagnet may be switched on and off to selectively generate the magnetic field during the vacuum infusion process. The strength of the magnetic field generated by the electromagnet may desirably be adjustable in order to control the amount of movement of magnetic element 150. Suitable electromagnets will be known to one of ordinary skill in the art from the description herein. However, it will be understood that magnetic field source 140 is not limited to an electromagnet, and may alternatively comprise a permanent magnet that is raised and lowered above flexible film 120 to generate the magnetic field.

Figure 3:
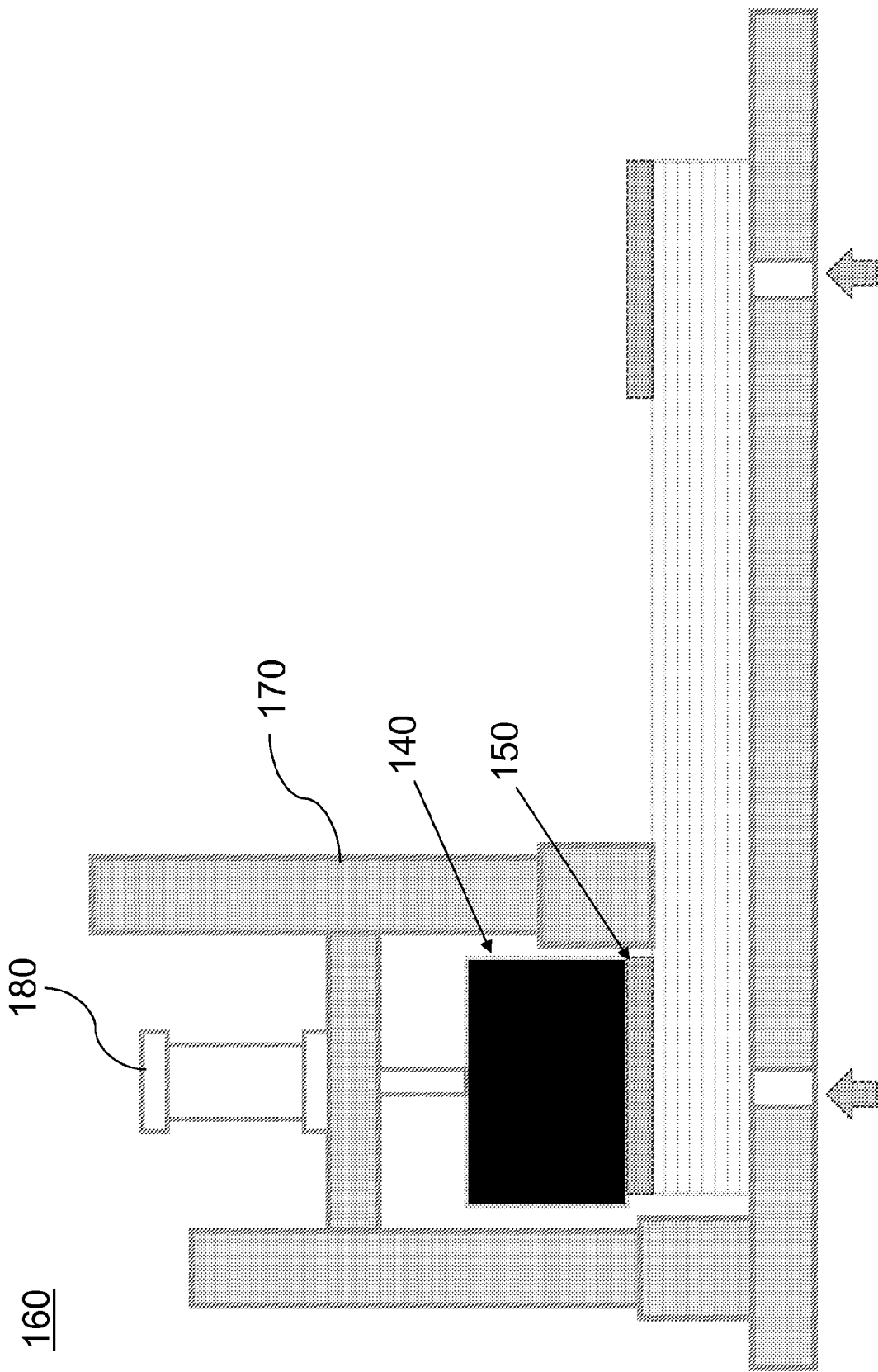
FIG. 3 is a diagram illustrating a workstation for implementing a vacuum infusion process in accordance with aspects of the present invention.

When magnetic field source 140 is positioned above flexible film 120, as shown in FIG. 1, it may be desirable that magnetic field source 140 be movably mounted. In particular, magnetic field source 140 is desirably movable in a direction toward or away from the upper side 112 of tool surface 110. Movement of magnetic field source 140 may be desirable to generate or accommodate for movement of flexible film 120 during operation, as will be explained in further detail below. In an exemplary embodiment, magnetic field source 140 is mounted to a pneumatic piston 180, as shown in FIG. 3. Pneumatic piston 180 is operable to move magnetic field source 140 away from the upper side 112 of tool surface 110.

When magnetic field source 140 is positioned below flexible film 120, it may be desirable that magnetic field source be coupled directly to tool surface 110. In an exemplary embodiment, magnetic field source 140 may be incorporated within tool surface 110. Incorporating magnetic field source 140 within tool surface 110 may be desirable to simplify manufacture and/or operation of system 100.

Magnetic element 150 is positioned to receive the magnetic field generated by magnetic field source 140. Magnetic element 150 is configured to move flexible film 120 under application of the magnetic field from magnetic field source 140. In particular, magnetic element 150 moves flexible film 120 away from the upper side 112 of tool surface 110 under application of the magnetic field, in order to enlarge the volume defined by flexible film 120, and thereby increase the permeability of preform 130.

Magnetic element 150 may be any component adapted to be manipulated by a magnetic field. When magnetic field source 140 is positioned above flexible film 120, magnetic element 150 is attracted by the magnetic field generated by magnetic field source 140. Magnetic field source 140 may desirably be positioned sufficiently close to magnetic element 150 that magnetic element 150 contacts magnetic field source 140 when moving under the applied magnetic field. Further, magnetic field source 140 may be positioned in contact with magnetic element 150 (or in contact with flexible film 120).

Conversely, magnetic field source 140 may be positioned below flexible film 120, and magnetic element 150 may be a reverse polarity magnet from magnetic field source 140, such that element 150 is repelled by the magnetic field generated by magnetic field source 140. In each of these configurations, magnetic element 150 moves upward, i.e. away from tool surface 110, under application of the magnetic field from magnetic field source 140.

In an exemplary embodiment, magnetic element 150 comprises one or more metal sheets, as shown in FIG. 1. The metal sheets may be formed from a ferrous material such as, for example, steel. The size of the metal sheets may be selected based on the size of the composite material to be formed and the toughness of flexible film 120. In the embodiment shown in FIG. 1, the metal sheets are approximately 1/8 inch thick squares having approximately 4 inch sides.

In an alternative exemplary embodiment, magnetic element 150 comprises a metal wire mesh, as shown in FIG. 2. The wire mesh may be formed from the same or similar materials as the metal sheet described above. The wire mesh may cover substantially the entire area covered by flexible film 120, as shown in FIG. 2, or may comprise separate wire mesh portions positioned in a pattern throughout the area covered by flexible film 120. It will be understood by one of ordinary skill in the art that the distribution of the portions, number of portions, size and geometry of the portions is not limited, but may be selected as needed by the infusion process. Use of a wire mesh may be desirable to enable flexibility of magnetic element 150 along with flexing of flexible film 120.

In another alternative exemplary embodiment, magnetic element 150 comprises one or more component magnets. Like the wire mesh, the component magnets may be positioned in a pattern throughout the area covered by flexible film 120. Suitable component magnets for use as magnetic element 150 will be known to one of ordinary skill in the art from the description herein.

Magnetic element 150 is configured to move flexible film 120 due to a connection between magnetic element 150 and flexible film 120. In one embodiment, magnetic element 150 may be coupled to the upper side 122 of flexible film 120. Accordingly, when magnetic element 150 experiences an upward force from magnetic field source 140, magnetic element 150 pulls flexible film 120 upward from its upper side 122. In another embodiment, magnetic element 150 may be positioned between the lower side 124 of flexible film 120 and an upper side of preform 130. Accordingly, when magnetic element 150 experiences an upward force from magnetic field source 140, magnetic element 150 pushes flexible film 120 upward from its lower side, as shown in FIG. 1. In still another embodiment, magnetic element 150 may be embedded within flexible film 120. Where magnetic element 150 is positioned beneath or embedded within flexible film 120, it may be desirable to line the edge of magnetic element 150 with a form of padding, in order to prevent or minimize damage to or stress on flexible film 120.

As set forth above, tool surface 110 includes an injection port 116 for enabling infusion of resin into the mold. Magnetic element 150 may desirably be positioned directly above injection port 116 in order to increase the permeability of preform 130 in the area immediately surrounding injection port 116.

While only one magnetic field source 140 is shown in FIG. 1, it will be understood that the invention is not so limited. A plurality of magnetic field sources 140 and/or magnetic elements 150 may be used to increase permeability over substantially the entire area covered by flexible film 120, as would be understood by one of ordinary skill in the art from the description herein.

System 100 is not limited to the above components, but may include alternative or additional components, as would be understood by one of ordinary skill in the art.

For one example, system 100 may form part of a VARTM workstation 160 configured to implement the vacuum infusion process, as shown in FIG. 3. Workstation 160 has the ability to spatially control the injection of resin by controlling the location of magnetic field source 140. In addition to the components of system 100, workstation 160 includes a gantry system 170. Gantry system 170 includes a plurality of linear actuators, stepper motors, and a motor controller (not shown) that are operable to move magnetic field source 140 in two dimensions to any area covered by flexible film 120. Gantry system 170 further includes a pneumatic piston 180. Pneumatic piston 180 is operable to move magnetic field source 140 in a third dimension, in a direction toward or away from tool surface 110. In a preferred embodiment, pneumatic piston 180 is operable to lower magnetic field source 140 into contact with flexible film 120 or magnetic element 150.

It will be understood to one of ordinary skill in the art that the invention is not limited to a workstation geometry as shown in FIG. 3. Workstation 160 may include any system configured to position magnetic field source 140 in desired locations in three dimensions above flexible film 120.

Gantry system 170 and pneumatic piston 180 are connected to a controller which controls the entire vacuum infusion process at workstation 160. The controller may use a computer program, such as a program written using LABVIEW® software (National Instruments, Austin, Tex.) or other similar software known in the art, in order to operate workstation 160. It will be understood, however, that the invention is not limited to any particular type of computer software or integrated hardware. Suitable computer hardware and associated software will be known to one of ordinary skill in the art from the description herein.

Figure 4:
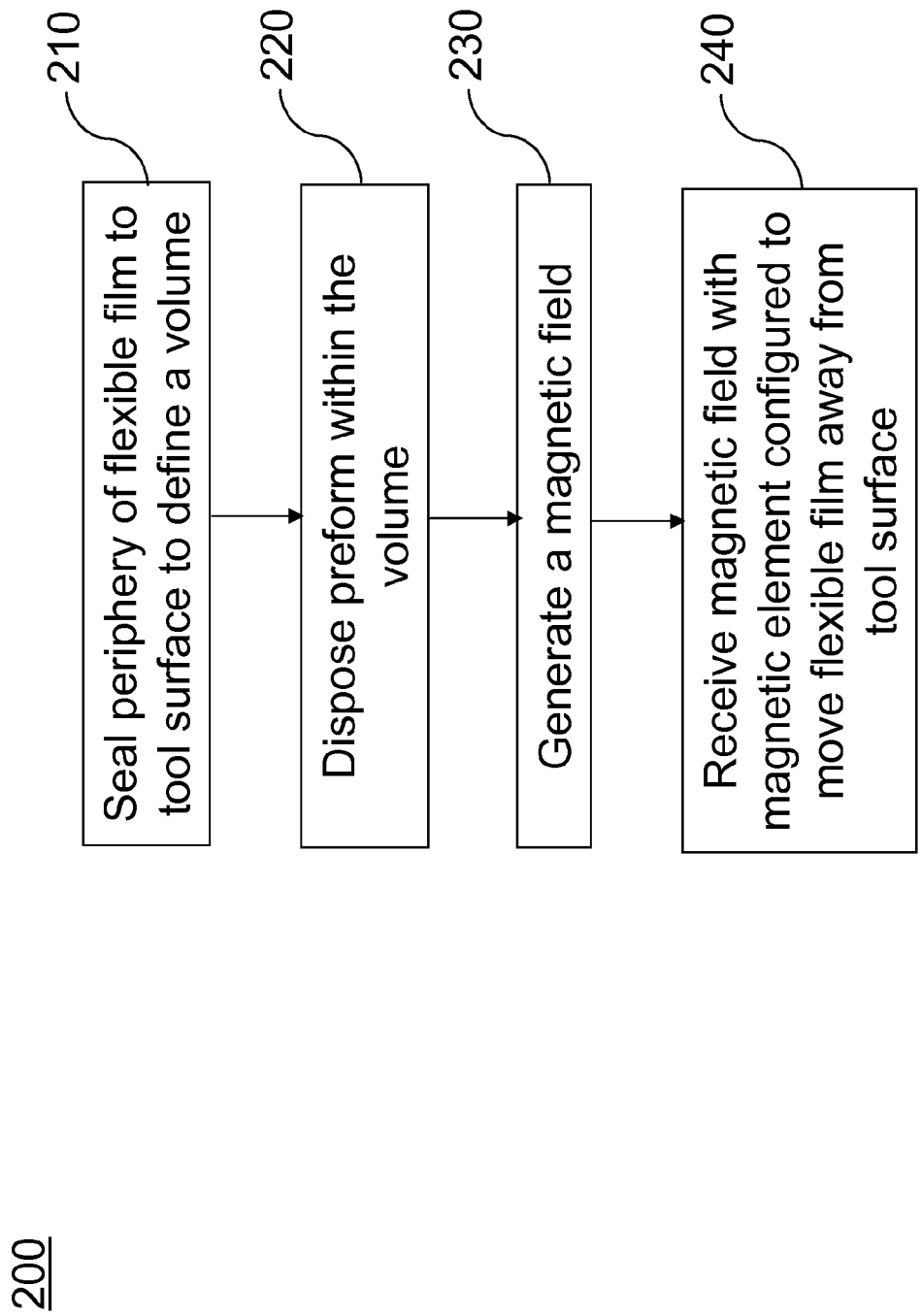
FIG. 4 is a flowchart illustrating an exemplary method for controlling permeability in a vacuum infusion process in accordance with aspects of the present invention.

FIG. 4 shows an exemplary method 200 for controlling permeability in a vacuum infusion process in accordance with aspects of the present invention. Method 200 is usable to increase the fabric permeability of a preform prior to infusion of resin in the vacuum infusion process. As a general overview, method 200 includes sealing a flexible film to a tool surface to define a volume, disposed a preform in the volume, generating a magnetic field, and received the magnetic field with a magnetic element. Additional details of method 200 are described herein with respect to the components of system 100.

In step 210, a flexible film is sealed to a tool surface. In an exemplary embodiment, the periphery 126 of flexible film 120 is sealed to the upper side 112 of tool surface 110 by sealant 128. A volume is defined between the lower side 124 of flexible film 120 and the upper side 112 of tool surface 110.

In step 220, a preform is disposed within the volume. In an exemplary embodiment, preform 130 is disposed within the volume between flexible film 120 and tool surface 110. It will be understood that preform 130 may be disposed within the volume before flexible film 120 is partially or completely sealed to tool surface 110.

In step 230, a magnetic field is generated. In an exemplary embodiment, magnetic field source 140 generates a magnetic field. Magnetic field source 140 may be switched on and off to selectively generate the magnetic field during the vacuum infusion process.

In step 240, the generated magnetic field is received with a magnetic element. In an exemplary embodiment, magnetic element 150 receives the magnetic field generated by magnetic field source 140. Under application of the magnetic field, magnetic element 150 moves flexible film 120 away from the upper side 112 of tool surface 110, thus increasing the volume between flexible film 120 and tool surface 110. As this volume increases, the spaces in between each layer of preform 130 become larger. The increase in space between the layers of preform 130 changes the manner in which resin flows is infused into (e.g. flows through) preform 130. The ability for resin to flow through a preform is called the fabric permeability. Thus, movement of flexible film 120 by magnetic element 150 increases the permeability of preform 130. Control of permeability of the fabric preform is desirable during an infusion so that successful infusion of the resin into the mold is made more reliable. To enable such control, the strength of the magnetic field generated by magnetic field source 140 may desirably be adjustable, in order to control the amount of movement of magnetic element 150.

In a preferred embodiment, magnetic field source 140 is positioned above flexible film 120. In this embodiment, step 240 comprises attracting magnetic element 150 toward magnetic field source 140 under application of the magnetic field. It may be desirable, however, that magnetic element 150 move a greater or lesser distance than that caused by application of the magnetic field alone. Accordingly, in a more preferred embodiment, magnetic field source 140 is positioned sufficiently close to magnetic element 150 that magnetic element 150 contacts magnetic field source 140 when moving under the applied magnetic field. In this embodiment, magnetic field source 140 can limit the distance moved by magnetic element 150.

In a still more preferred embodiment, magnetic field source 140 is movably mounted. In this embodiment, magnetic field source 140 may be moved downward to be in contact with magnetic element 150 or flexible film 120. If magnetic field source 140 is an electromagnet, magnetic field source 140 may be switched on only after being moved into contact with magnetic element 150. After magnetic field source 140 is moved into contact with magnetic element 150 (or flexible film 120), magnetic field source 140 is moved in a direction away from the upper side 112 of tool surface 110. Magnetic field source 140 may be moved, for example, by actuating a pneumatic piston to draw magnetic field source 140 away from tool surface 110. By moving magnetic field source 140 while magnetic element 150 is still in contact, magnets having much lower strengths may be used for magnetic field source 140 and/or magnetic element 150. Additionally, the amount of movement of flexible film 120 (and thus the permeability of preforms 130) may be precisely controlled by system 100. At the conclusion of the vacuum infusion process, magnetic field source 140 may be turned off (when it is an electromagnet), allowing magnetic element 150 to fall back toward tool surface 110 under the force of gravity.

In an alternate embodiment, magnetic field source 140 is positioned below flexible film 120. In this embodiment, step 240 comprises repelling magnetic element 150 away from magnetic field source 140 under application of the magnetic field.

Method 200 is not limited to the above steps, but may include alternative steps and additional steps, as would be understood by one of ordinary skill in the art from the description herein.

For one example, method 200 may further include the step of infusion a polymer resin into the mold after the permeability is increased. In an exemplary embodiment, a polymer resin is infused into the volume defined by flexible film 120 and tool surface 110. The polymer resin is infused through injection ports 116 of tool surface 110. The polymer resin is injected while the permeability of preform 130 is enhanced, i.e., when the flexible film 120 has been moved away from the upper side 112 of tool surface 110 by magnetic element 150.

Once the flow front of resin reaches the periphery of the magnetic element 150, magnetic field source 140 may stop generating a magnetic field. The release of magnetic element 150 back toward tool surface 110 will force any excess resin into any remaining dry sections of preform 130. The distance between injection ports 116 can be optimized so that the flow front of resin reaches the next injection port at approximately the same time when all excess resin is disbursed.

After resin has filled the volume in the area of magnetic element 150, magnetic field source 140 may be removed from flexible film 120 and relocated over a different magnetic element 150. The process may then be repeated for an injection port 116 beneath the different magnetic element 150. During the injection process, air trapped within the volume between flexible film 120 and tool surface 110 may be ejected through a vent. Optionally, a vacuum pump may be coupled to a vent to assist in evacuating air from the volume.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for controlling permeability in a vacuum infusion process comprising:
   sealing a periphery of a flexible film to a tool surface to define a volume between a lower side of the flexible film and an upper side of the tool surface;
   disposing a preform within the volume;
   providing a plurality of magnetic elements, each of the plurality of magnetic elements configured to move a portion of the flexible film away from the upper side of the tool surface under the application of a magnetic field, each of the plurality of magnetic elements moveable relative to one another in an attraction or repulsion direction of the magnetic field, and each of the plurality of magnetic elements having a relative size smaller than the flexible film overlying the preform, wherein the plurality of magnetic elements comprise a first subset consisting of one or more but fewer than all of the plurality of magnetic elements and a second subset consisting of one or more but fewer than all of the plurality of magnetic elements, and wherein the first subset is different than the second subset; and
further comprising the sequential steps of:
   generating a first magnetic field with one or more magnetic field sources;
   receiving the first magnetic field with the first subset, thereby increasing permeability of at least a portion of the preform corresponding to an area of the flexible film moved by the first subset;
   moving the one or more magnetic field sources, thereby relocating the one or more magnetic field sources in a direction parallel to the tool surface;
   generating a second magnetic field with the one or more magnetic field sources; and
   receiving the second magnetic field with the second subset, thereby increasing permeability of at least a portion of the preform corresponding to an area of the flexible film moved by the second subset.

2. The method of claim 1, wherein the receiving the first magnetic field step comprises:
   attracting the first subset toward the one or more magnetic field sources under the application of the first magnetic field.

3. The method of claim 2, wherein the receiving the first magnetic field step comprises:
   attracting the first subset toward the one or more magnetic field sources to contact the one or more magnetic field sources with the first subset or the flexible film when moving under the application of the first magnetic field.

4. The method of claim 3, further comprising the step of:
   moving the one or more magnetic field sources in a direction away from the upper side of the tool surface.

5. The method of claim 1, wherein the receiving the first magnetic field step comprises:

repelling the first subset away from the one or more magnetic field sources under the application of the first magnetic field.

6. The method of claim 1, further comprising the step of: injecting a polymer resin into the volume when the area of the flexible film is moved away from the upper side of the tool surface by the first subset.

7. The method of claim 1, wherein the receiving the first magnetic field step comprises increasing the permeability of at least a portion of the preform by increasing a space between layers of the preform.

8. The method of claim 1, wherein the portion of the flexible film moved by the first subset is smaller in relative dimension than the flexible film overlying the preform.

9. The method of claim 1, wherein each of the plurality of magnetic elements comprises a metal sheet.

10. The method of claim 1, wherein each of the plurality of magnetic elements comprises a portion of metal wire mesh.

11. The method of claim 10, wherein the portion of metal wire mesh is a connected portion of a larger metal wire mesh overlying the preform.

12. The method of claim 10, wherein the portion of metal wire mesh comprises one or more of a plurality of discrete metal wire mesh elements, wherein each discrete metal wire mesh element has a relative size smaller than the flexible film overlying the preform.

13. The method of claim 10, wherein each of the plurality of magnetic elements comprises a component magnet.

14. The method of claim 1, wherein each of the one or more magnetic field sources is configured to generate a corresponding magnetic field received by fewer than all of the plurality of magnetic elements.

15. The method of claim 14, wherein each of the one or more magnetic field sources comprises an electromagnetic magnetic field source connected to a source of power,
wherein the receiving the first magnetic field step comprises applying the first magnetic field to the first subset by providing power to the one or more magnetic field sources, and
wherein the receiving the second magnetic field step comprises applying the second magnetic field to the second subset by providing power to the one or more magnetic field sources.

16. The method of claim 1, further comprising the step of:
identifying an area of the preform in need of increased permeability,
wherein the receiving the first magnetic field step comprises applying the first magnetic field to the first subset to increase permeability in the identified area.

* * * * *